United States Patent
Suwabe

(10) Patent No.: US 9,519,475 B2
(45) Date of Patent: Dec. 13, 2016

(54) INFORMATION PROCESSING APPARATUS THAT PERFORMS UPDATE OF SOFTWARE, CONTROL METHOD THEREFOR, AND STORAGE MEDIUM

(71) Applicant: CANON KABUSHIKI KAISHA, Tokyo (JP)

(72) Inventor: Takeshi Suwabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/296,945

(22) Filed: Jun. 5, 2014

(65) Prior Publication Data

US 2014/0373002 A1    Dec. 18, 2014

(30) Foreign Application Priority Data

Jun. 17, 2013    (JP) .................. 2013-126607

(51) Int. Cl.
*G06F 9/44*    (2006.01)
*G06F 9/445*    (2006.01)

(52) U.S. Cl.
CPC ............... *G06F 8/665* (2013.01); *G06F 8/65* (2013.01)

(58) Field of Classification Search
CPC ........................................... G06F 8/65
USPC ........................................ 717/171
See application file for complete search history.

(56) References Cited

U.S. PATENT DOCUMENTS

2012/0062948 A1* 3/2012 Nishikawa ............ 358/1.15

FOREIGN PATENT DOCUMENTS

JP    2007-179100 A    7/2007

OTHER PUBLICATIONS

"Windows Update"; Wikipedia website (wikipedia.org); May 20, 2013.*
"Wait (Command)"; Wikipedia website (wikipedia.org); Feb. 28, 2013.*
"Expedite Delivery of New or Urgent Updates"; Microsoft website (technet.microsoft.com); Aug. 12, 2004.*

* cited by examiner

*Primary Examiner* — Qing Chen
*Assistant Examiner* — Clint Thatcher
(74) *Attorney, Agent, or Firm* — Rossi, Kimms & McDowell LLP

(57) ABSTRACT

An information processing apparatus which is capable of, when in software updating, a need to perform an additional update arises in addition to regular updates, efficiently performing the updates. First time information indicative of a first time at which update firmware is obtained from an external server is applied is set, and second time information indicative of a second time at which the update firmware obtained from the external server is applied to the information processing apparatus is set. When update firmware is obtained based on the first time information, the update firmware is applied to the information processing apparatus at the second time indicated by the second time information. When a need to perform an additional update of firmware arises, additional update firmware relating to the additional update is applied to the information processing apparatus earlier than the second time indicated by the second time information.

11 Claims, 6 Drawing Sheets

INFORMATION PROCESSING APPARATUS THAT PERFORMS UPDATE OF SOFTWARE, CONTROL METHOD THEREFOR, AND STORAGE MEDIUM

BACKGROUND OF THE INVENTION

Field of the Invention

The present invention relates to an information processing apparatus, a control method therefor, and a computer-readable storage medium storing a program for implementing the control method.

Description of the Related Art

For software updating, there is generally known a method that automatically updates software on at regular time intervals against the background of a demand to keep software up to date.

For office machines as well, the function and service of regular updating have become common, but to this, there is the background of a demand to update software during a period for which an office machine is not in use, not during a period for which an office machine is used as well as the background of a demand to keep software up to date.

On the other hand, in software updating, target software is downloaded, and after that, the software is updated, but a time required for downloading largely depends on a communication environment, and hence this time cannot be predicted.

Thus, there is known a technique that, in order to update software with intended timing, sets a download time and an upload time separately and downloads software in advance before uploading software.

Windows (registered trademark) Update is generally known as the technique of downloading and uploading software separately. In Windows (registered trademark) Update, a downloading method can be selected from automatic downloading and manual downloading, and in the case of automatic downloading, target software is downloaded in the background in advance, and the software is updated with different timing.

There may be cases where a need to perform an urgent or additional update (hereafter referred to as an "additional update") of software arises in addition to a regular update of software. Examples of the cases include a case where software such as troubleshooting firmware or research firmware is updated. This updating is urgent unlike normal regular updating.

In relation to additional updating, there has been known a technique according to which, in a case where a plurality of users shares a plurality of computers, and each computer is executing jobs beyond the number of computers assigned to each user (job limit), when a job is input from any other user, the jobs being in execution beyond the job limit are suspended and queued (see, for example, Japanese Laid-Open Patent Publication (Kokai) No. 2007-179100).

However, according to the conventional regular update technique, for example, when a need to perform an additional update arises, the additional update is performed in timing with a next regular update.

Specifically, in a case where it is configured such that in regular updating, software is downloaded on Monday and updated on Friday, when a need to perform an additional update arises between Monday and Friday, only software for regular updating which has already been downloaded on Monday is to be updated on Friday, and hence the additional update has to wait until Friday next week on which a next regular update is scheduled.

On the other hand, an additional update may be performed with desired timing by canceling a regular update setting and manually downloading software for the additional update, but in this case, a regular update setting should be configured again.

Japanese Laid-Open Patent Publication (Kokai) No. 2007-179100 describes a technique that, when a need to execute a job arises during execution of another job, suspends and copies the job being executed and queues it in a later stage. The input of the other job may be regarded as an update of the job being in execution, but this publication mentions neither the relation between the jobs nor execution of the suspended job.

In Windows (registered trademark) Update, when a need to update a plurality of modules arises, modules to be updated are accumulated in an order in which the modules occurred. Moreover, these updates are not performed unless a user approves execution thereof, and hence whether or not the accumulated modules will be updated is unknown.

SUMMARY OF THE INVENTION

The present invention provides an information processing apparatus and a control method therefor, which are capable of, when in software updating, a need to perform an additional update arises in addition to a regular update, efficiently performing the updates, as well as a computer-readable storage medium storing a program for implementing the control method.

Accordingly, a first aspect of the present invention provides an information processing apparatus capable of communicating with an external apparatus via a network, comprising an obtaining unit configured to obtain, from the external apparatus, update firmware for updating firmware for the information processing apparatus, an applying unit configured to apply the update firmware obtained by the obtaining unit to the information processing apparatus, a first setting unit configured to set first time information indicative of a first time at which the obtaining unit obtains the update firmware from the external apparatus, and a second setting unit configured to set second time information indicative of a second time at which the update firmware obtained from the external apparatus is applied to the information processing apparatus, wherein, when the obtaining unit obtains the update firmware based on the first time information, the applying unit applies the update firmware to the information processing apparatus at the second time indicated by the second time information, and wherein, when a need to perform an additional update of firmware arises, the applying unit applies additional update firmware relating to the additional update earlier than the second time indicated by the second time information.

Accordingly, a second aspect of the present invention provides an information processing apparatus comprising an obtaining unit configured to obtain update firmware for updating firmware for the information processing apparatus, a setting unit configured to set time information indicative of a time at which the update firmware is applied to the information processing apparatus, an applying unit configured to apply the update firmware to the information processing apparatus based on the time information, and a determination unit configured to, when a need to perform an additional update of the firmware arises, determine whether to apply additional update firmware relating to the additional update to the information processing apparatus based on the time information.

Accordingly, a third aspect of the present invention provides a control method for an information processing apparatus capable of communicating with an external apparatus via a network, comprising an obtaining step of obtaining, from the external apparatus, update firmware for updating firmware for the information processing apparatus, an applying unit of applying the update firmware obtained in the obtaining step to the information processing apparatus, a first setting step of setting first time information indicative of a first time at which the update firmware from the external apparatus is obtained in the obtaining step, and a second setting step of setting second time information indicative of a second time at which the update firmware obtained from the external apparatus is applied to the information processing apparatus, wherein, when the update firmware is obtained based on the first time information in the obtaining step, the update firmware is applied to the information processing apparatus at the second time indicated by the second time information in the applying step, and wherein, when a need to perform an additional update of firmware arises, additional update firmware relating to the additional update is applied to the information processing apparatus earlier than the second time indicated by the second time information in the applying step.

Accordingly, a fourth aspect of the present invention provides a non-transitory computer-readable storage medium storing a program for causing a computer to execute a control method for an information processing apparatus capable of communicating with an external apparatus via a network, the control method comprising an obtaining step of obtaining, from the external apparatus, update firmware for updating firmware for the information processing apparatus, an applying step of applying the update firmware obtained in the obtaining step to the information processing apparatus, a first setting step of setting first time information indicative of a first time at which the update firmware from the external apparatus is obtained in the obtaining step, and a second setting step of setting second time information indicative of a second time at which the update firmware obtained from the external apparatus is applied to the information processing apparatus, wherein, when the update firmware is obtained based on the first time information in the obtaining step, the update firmware is applied to the information processing apparatus at the second time indicated by the second time information in the applying step, and wherein, when a need to perform an additional update of firmware arises, additional update firmware relating to the additional update is applied to the information processing apparatus earlier than the second time indicated by the second time information in the applying step.

Accordingly, a fifth aspect of the present invention provides a control method for an information processing apparatus comprising an obtaining step of obtaining update firmware for updating firmware for the information processing apparatus, a setting step of setting time information indicative of a time at which the update firmware is applied to the information processing apparatus, an applying step of applying the update firmware to the information processing apparatus based on the time information, and a determination step of, when a need to perform an additional update of the firmware arises, determining whether to apply additional update firmware relating to the additional update to the information processing apparatus based on the time information.

Accordingly, a sixth aspect of the present invention provides a non-transitory computer-readable storage medium storing a program for causing a computer to execute a control method for an information processing apparatus, the control method comprising an obtaining step of obtaining update firmware for updating firmware for the information processing apparatus, a setting step of setting time information indicative of a time at which the update firmware is applied to the information processing apparatus, an applying step of applying the update firmware to the information processing apparatus based on the time information, and a determination step of, when a need to perform an additional update of the firmware arises, determining whether to apply additional update firmware relating to the additional update to the information processing apparatus based on the time information.

According to the present invention, when a need to perform an additional update arises in addition to a regular update, new software obtained as firmware for the additional update is applied to the information processing apparatus with timing earlier than an application time for the regular update or in synchronization with the regular update, and therefore, as compared to the prior art, firmware for the additional update can be more quickly applied to the information processing apparatus, and a user does not have to perform burdensome operations, so that firmware can be updated in an efficient manner.

Further features of the present invention will become apparent from the following description of exemplary embodiments (with reference to the attached drawings).

DESCRIPTION OF THE EMBODIMENTS

The present invention will now be described with reference to the drawings showing an embodiment thereof.

Figure 1:
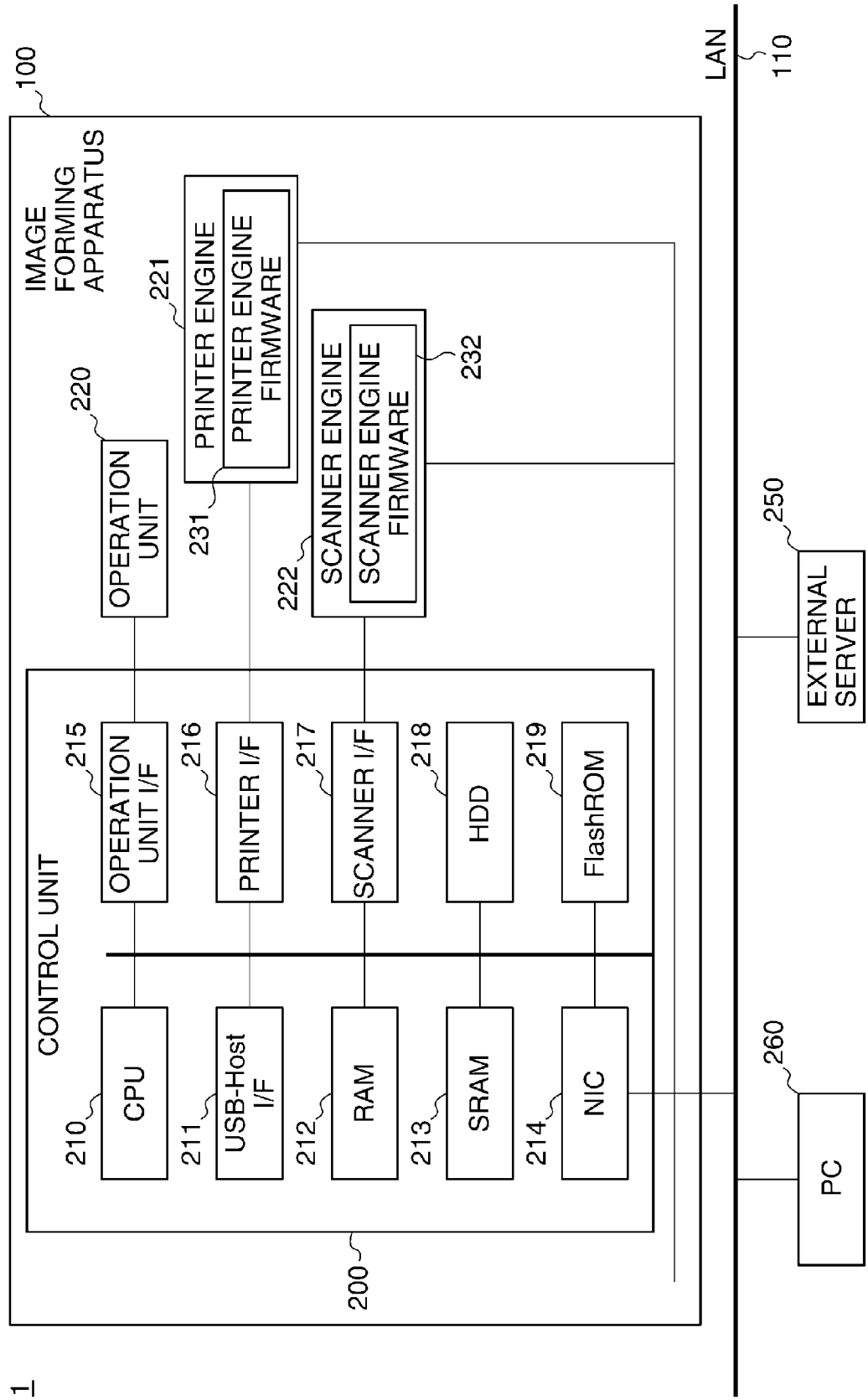
FIG. 1 is a diagram schematically showing an arrangement of an image forming system including an image forming apparatus which is an information processing apparatus according to an embodiment of the present invention.

FIG. 1 is a diagram schematically showing an arrangement of an image forming system 1 including an image forming apparatus 100 which is an information processing apparatus according to an embodiment of the present invention.

Referring to FIG. 1, the image forming apparatus 100 is comprised of a control unit 200, an operation unit 220, a printer engine 221, and a scanner engine 222.

The control unit 200 controls the overall operation of the image forming apparatus 100. The operation unit 220 has a liquid crystal display unit, which has a touch panel function, a keyboard, and so on, and displays information for a user and receives operations from the user.

The printer engine 221, which has a CPU, a ROM, and so on, not shown, prints an image on a recording sheet by operating in accordance with printer engine firmware 231 stored in the ROM. The scanner engine 222, which has a CPU, a ROM, and so on, not shown, reads an image off an original by operating in accordance with scanner engine firmware 232 stored in the ROM.

A detailed description will now be given of the control unit 200. The control unit 200 is comprised of a CPU 210, a USB Host interface 211, a RAM 212, an SRAM 213, a NIC 214, an operation unit interface 215, a printer interface 216, a scanner interface 217, an HDD 218, and a flash ROM 219.

The CPU 210 reads out programs stored in the flash ROM 219 to carry out various control processes such as reading control, printing control, and firmware update control. Programs for executing flowcharts, to be described later, are also stored in the flash ROM 219. The programs mentioned above are firmware (software).

The flash ROM 219 is provided with an area in which files downloaded during update are stored, a work area, and a user data area. The RAM 212 is used as a temporary storage area such as a main memory and a work area for the CPU 210.

The SRAM 213, which is a backup RAM, stores setting values, image adjustment values, and so on which are required for the image forming apparatus 100. The HDD 218 stores image data, user data, and so on.

The operation unit interface 215 is an interface between the operation unit 220 and the control unit 200. The printer interface 216 is an interface between the printer engine 221 and the control unit 200. The scanner interface 217 is an interface between the scanner engine 222 and the control unit 200.

The NIC 214 is an interface between the control unit 200 and the LAN 110. The NIC 214 sends image data to an external server 250 and a PC 260, which are connected to the LAN 110, and downloads firmware for the control unit 200 and firmware for updating the printer engine firmware 231 and the scanner engine firmware 232.

The NIC 214 also receives information about settings on regular updates from the external server 250. It should be noted that the external server 250 may be on the Internet.

The USB Host interface 211 is an interface for connecting a USB memory or the like, which is a USB-Host device, to the image forming apparatus 100, and downloads firmware stored in a USB memory or the like.

Thus, in the present embodiment, firmware may be downloaded from any of the external server 250, the USB memory, the PC 260, and so on, but in the following description, it is assumed that firmware is downloaded from the external server 250.

Figure 2:
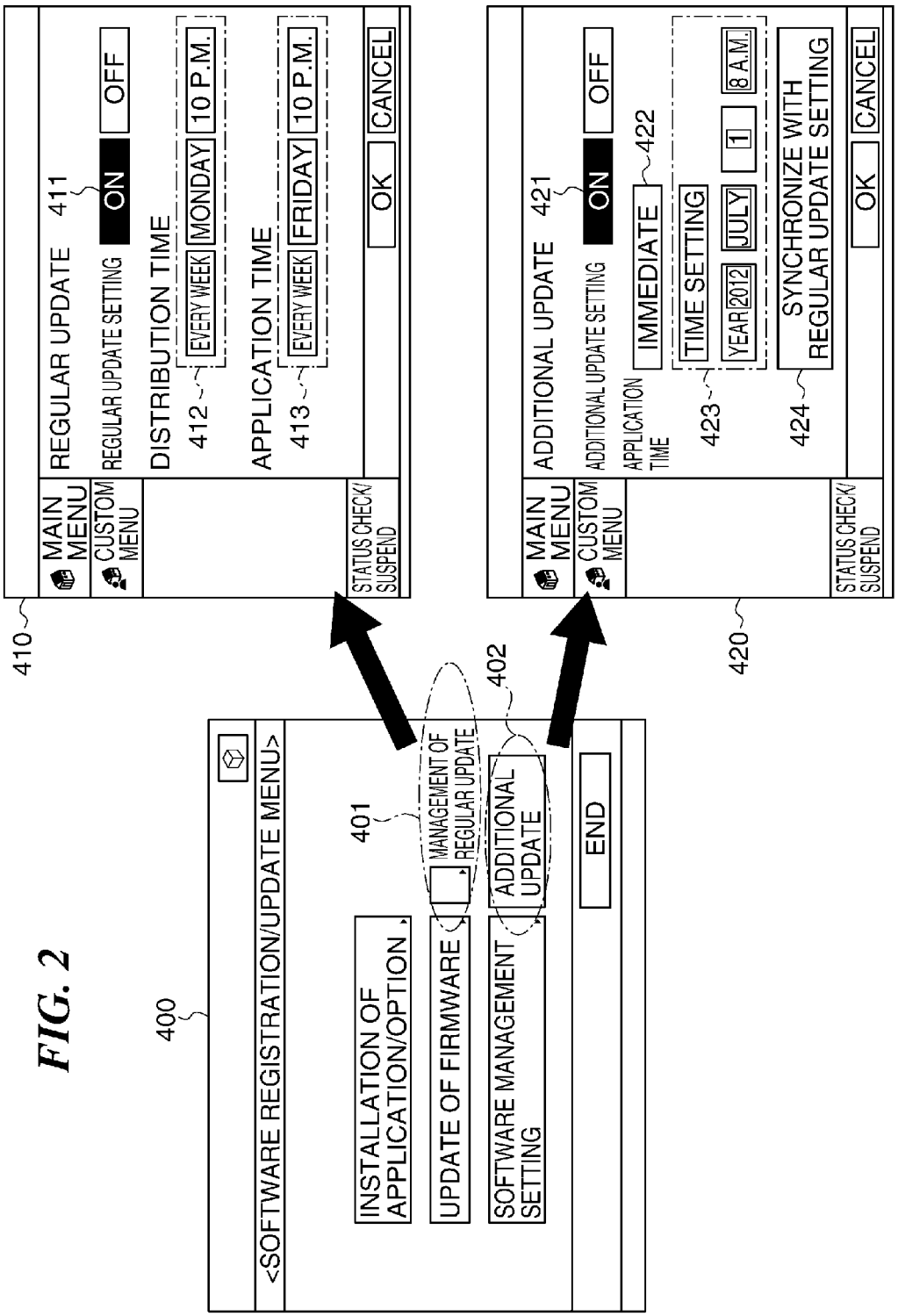
FIG. 2 is a view showing exemplary screens displayed on an operation unit in FIG. 1.

FIG. 2 is a view showing exemplary screens displayed on the operation unit 220 in FIG. 1.

Referring to FIG. 2, a main menu screen 400, a regular update setting screen 410, and an additional update setting screen 420 are displayed on the operation unit 220.

The main menu screen 400 includes a management key 401 for going to the regular update setting screen 410, and a management key 402 for going to the additional update setting screen 420.

In the present embodiment, there are two updates consisting of a regular update and an additional update. As compared to firmware for the regular update, firmware for the additional update is urgent from the standpoint of application to the image forming apparatus 100.

In the case of configuring the regular update, a user depresses, on the main menu screen 400, the management key 401 for the regular update to display the regular update screen 410. The user then depresses an ON key 411 on the regular update setting screen 410, and sets, in a distribution time setting field 412, a day and time at which downloading will be performed. When the set day and time comes, the image forming apparatus 100 checks whether or not there is the latest firmware in the external server 250, and when there is the latest firmware, the image forming apparatus 100 downloads the same. The CPU 210 stores, in the SRAM 213, the day and time set in the distribution time setting field 412.

The user also sets, in an application time setting field 413, a day and time which the regular update will be performed. When the set day and time comes, the image forming apparatus 100 starts updating firmware that has already been downloaded. The CPU 210 stores, in the SRAM 213, the day and time set in the application time setting field 413. It should be noted that in the example shown in FIG. 2, the time at which downloading is performed (distribution time) is 10:00 p.m. on Monday every week, and the time at which updating is performed (application time) is 10:00 p.m. on Friday every week.

In the case of configuring the additional update, the user depresses, on the main menu screen 400, the management key 402 for the additional update to display the additional update setting screen 420. The user then depresses an ON key 421 on the additional update setting screen 420, and sets an application time. In the present embodiment, any one of "immediate" 422, "specify time" 423, and "synchronize with regular update setting" 424 can be set as the application time. When the ON key 421 is depressed and the application time is set, the CPU 210 sets an additional update flag, which is indicative of whether or not to perform the additional update, and stores the same in the SRAM 213.

When the user depresses the immediate key 422, the additional update is performed at this time point. When the user sets a date and time in the additional application time setting field 423, the set date and time is stored in the SRAM 213, and when the set date and time comes, the additional update is performed.

It should be noted that no date and time earlier than the day and time set in the application time setting field 423 can be set in the additional application time setting field 423.

When the user depresses the synchronize with regular update setting key 424 on the additional update setting screen 420, it is configured such that the additional update is performed in synchronization with the regular update. For example, in the example shown in FIG. 2, the additional update as well as the regular update is performed at 10:00 p.m. on Friday.

It should be noted that the additional update setting screen 420 described above is displayed as appropriate not only when the management key 402 is depressed but also when a need to perform the additional update arises.

Figure 3:
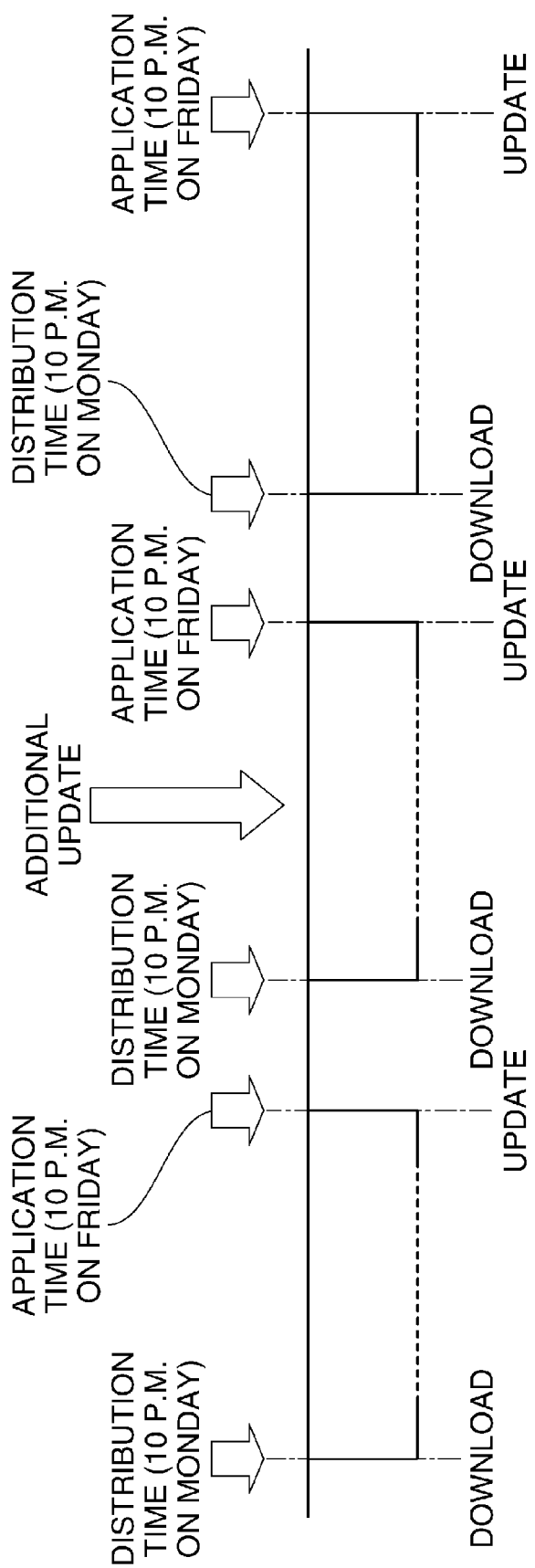
FIG. 3 is a diagram showing an exemplary time chart of regular updates performed in the image forming apparatus in FIG. 1.

FIG. 3 is a view showing an exemplary time chart of regular updates performed in the image forming apparatus 100 in FIG. 1.

Referring to FIG. 3, the regular update is performed three times. As shown in FIG. 3, in the regular update each time, firmware is distributed at 10:00 p.m. on Monday, and the application time is 10:00 pm on Friday, but in the second regular update, a need to perform the additional update arises.

In the example shown in FIG. 3, it is assumed that firmware updated by the regular update is firmware for the control unit 200, and firmware updated by the additional update is the printer engine firmware 231.

Figure 4A:
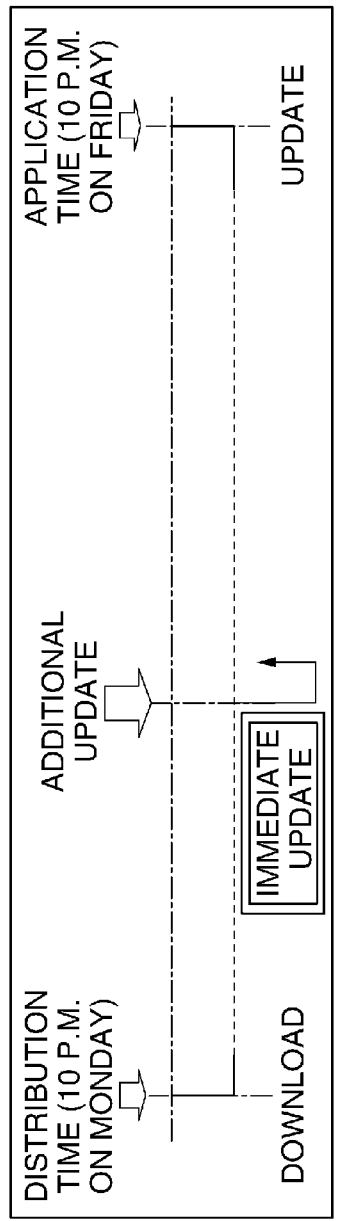
FIGS. 4A to 4C are views showing exemplary time charts of an additional update performed in the image forming apparatus in FIG. 1.
Figure 4B:
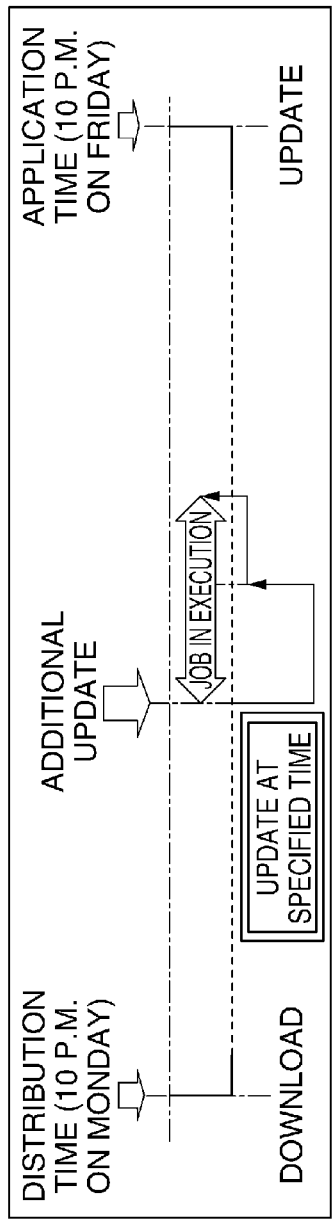
Figure 4C:
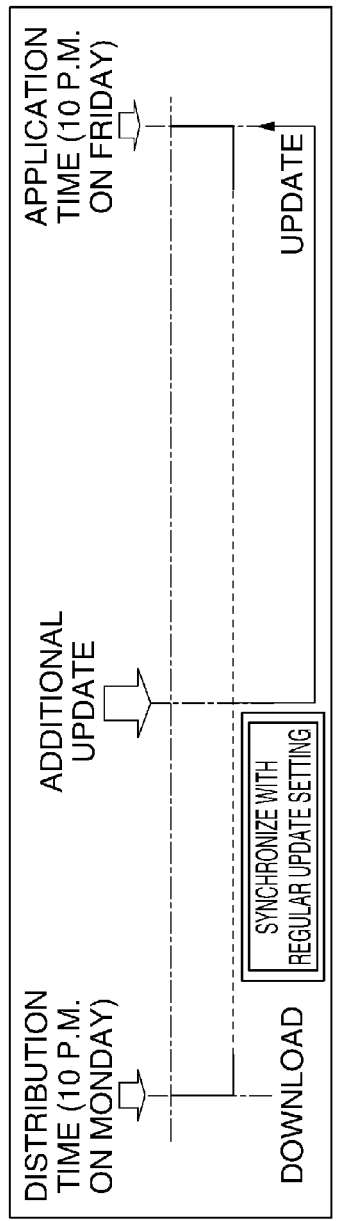

FIGS. 4A to 4C are views showing exemplary time charts of the additional update performed in the image forming apparatus 100 in FIG. 1 in which the regular update is configured.

FIG. 4A is a view showing a time chart in a case where immediate 422 is set as the application time for the additional update. Referring to FIG. 4A, firmware for the regular update was downloaded at 10:00 p.m. on Monday. The same applies to FIGS. 4B and 4C which will be referred to later.

When a need to perform the additional update arises in this state, the CPU 210 refers to the additional update flag stored in the SRAM 213, and automatically cancels the regular update in response to the flag being on. The CPU 210 then downloads firmware for the additional update and combines it with firmware for the canceled regular update to newly reconfigure firmware to be updated (update firmware).

It should be noted that in FIG. 4B as well as FIG. 4A, firmware for the regular update is not deleted when the CPU 210 automatically cancels the regular update, but may be deleted when the regular update is canceled and downloaded again.

As described above, in the present embodiment, firmware for the regular update is firmware for the control unit 200, and firmware for the additional update is the printer engine firmware 231. Thus, the reconfigured firmware to be updated is a combination of the firmware for the controller 200 and the printer engine firmware 231.

When firmware to be reconfigured is determined, the CPU 210 clears the additional update flag. The CPU 210 then immediately starts the additional update as a general rule.

With this immediate additional update, an update of firmware for the regular update planned at 10:00 p.m. on Friday is also performed, and hence the regular update is not performed at 10:00 p.m. on Friday as initially planned.

FIG. 4B is a view showing a time chart in a case where the application time for the additional update is set in the additional application time setting field 423.

Referring to FIG. 4B, when a need to perform the additional update arises, the regular update is automatically canceled, and firmware to be updated is reconfigured as with the example shown in FIG. 4A.

When firmware to be reconfigured is determined, the CPU 210 clears the additional update flag. When the date and time set in the additional application time setting field 423 comes, the CPU 210 immediately starts the additional update as a general rule, but when a job is being executed as shown in the figure, the CPU 210 starts the additional update after the job is completed.

With this additional update based on the specified additional application time, an update of firmware for the regular update planned at 10:00 p.m. on Friday is also performed, and hence the regular update is not performed at 10:00 p.m. on Friday as initially planned.

FIG. 4C is a view showing a time chart in a case where synchronize with regular update setting 424 is set as the application time for the additional update.

Referring to FIG. 4C, when a need to perform the additional update arises, the regular update is automatically canceled, and firmware to be updated is reconfigured as with the example shown in FIG. 4A.

When firmware to be reconfigured is determined, the CPU 210 clears the additional update flag. Then, in synchronization with the regular update, the CPU 210 immediately starts the additional update as a general rule. It should be noted that in FIGS. 4A and 4C as well, if a job is being executed, the CPU 210 starts the additional update after the job is completed as with the case shown in FIG. 4B, although this is not shown in the figure.

Figure 5:
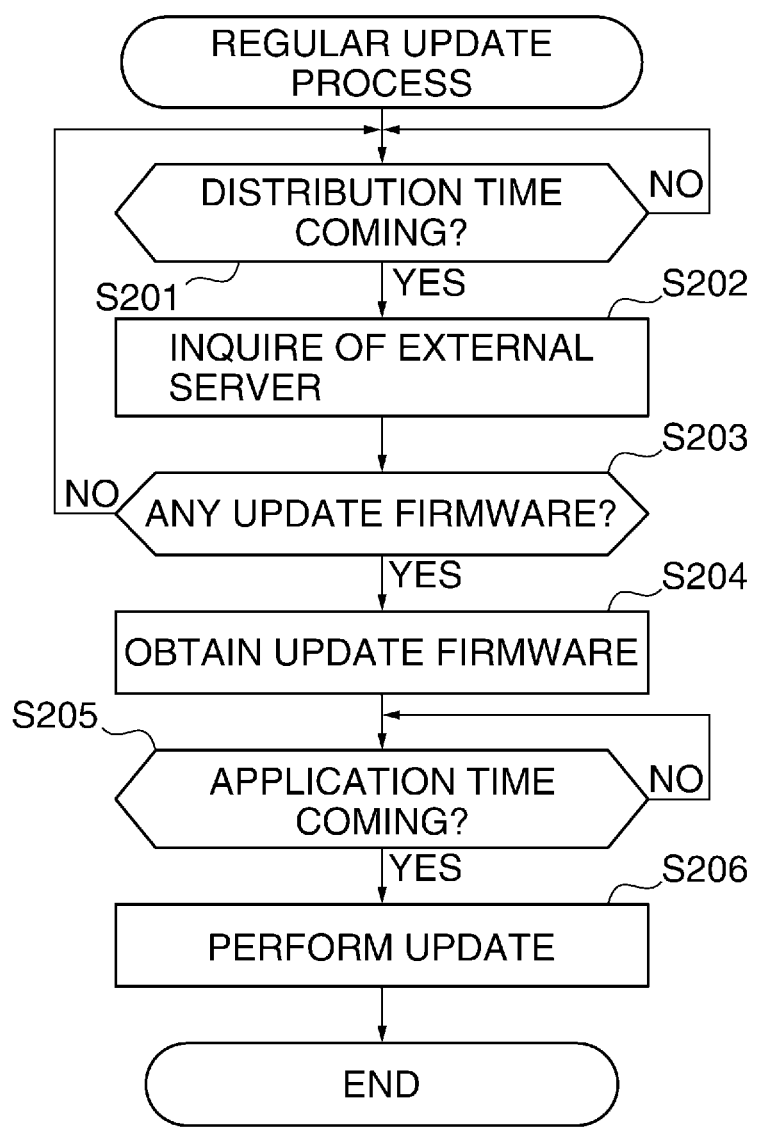
FIG. 5 is a flowchart showing the procedure of a regular update process carried out by a CPU in FIG. 1.

FIG. 5 is a flowchart showing the procedure of a regular update process carried out by the CPU 210 in FIG. 1.

Referring to FIG. 5, when a distribution time set in the distribution time setting field 412 comes (YES in step S201), the CPU 210 inquires the external server 250 about whether or not there is firmware to be updated, which is new software, in the external server 250 (step S202).

The CPU 210 then determines whether or not there is firmware to be updated in the external server 250 (step S203). As a result of the determination in the step S203, when there is no firmware to be updated in the external server 250 (NO in the step S203), the process returns to the step S201.

On the other hand, as a result of the determination in the step S203, when there is firmware to be updated in the external server 250 (YES in the step S203), the CPU 210 obtains the firmware to be updated (step S204), and when an application time comes (YES in step S205), the CPU 210 performs the regular update (step S206) and terminates the present process.

Figure 6:
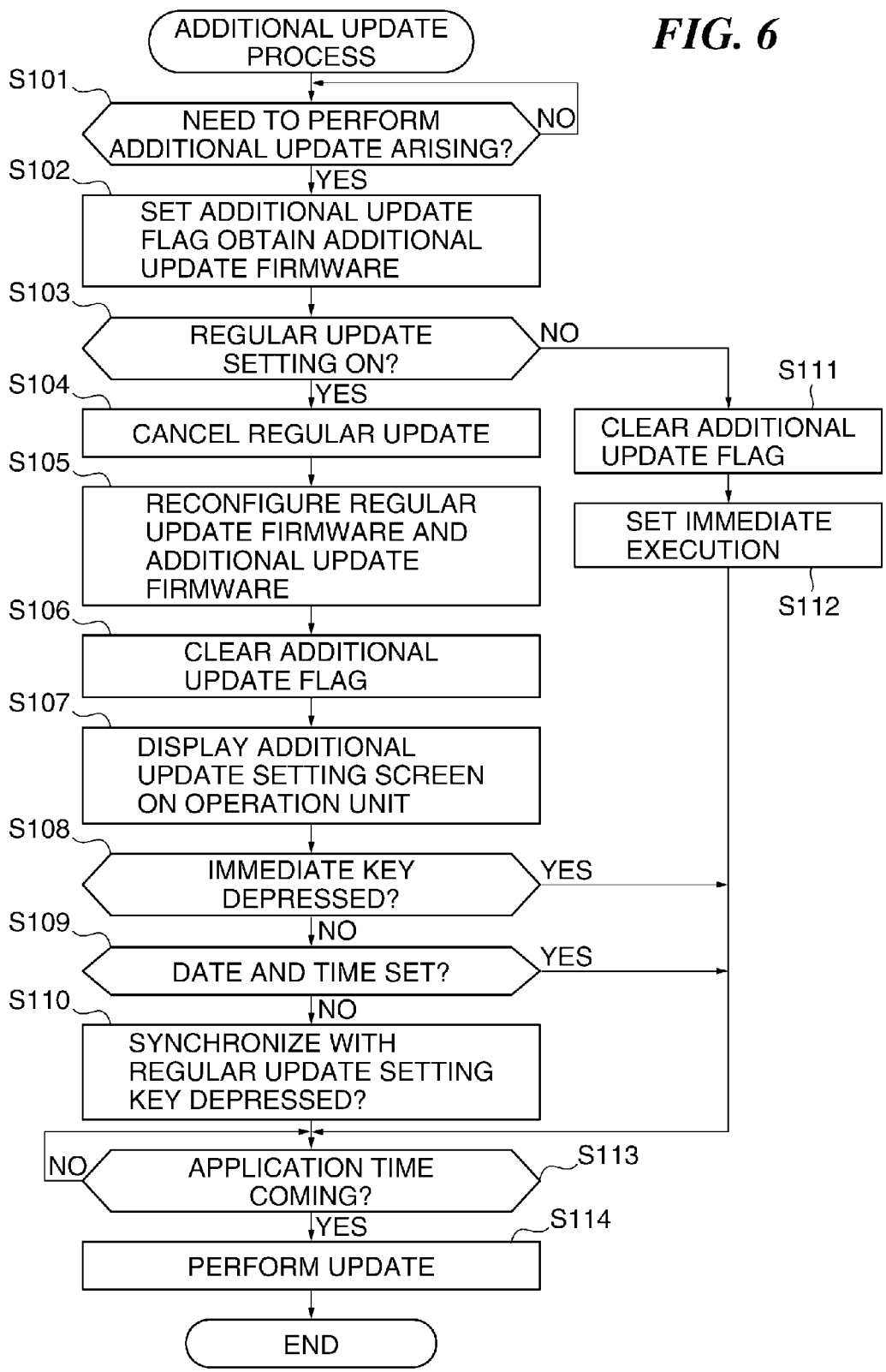
FIG. 6 is a flowchart showing the procedure of an additional update process carried out by the CPU in FIG. 1.

FIG. 6 is a flowchart showing the procedure of an additional update process carried out by the CPU 210 in FIG. 1.

Referring to FIG. 6, for example, when it is determined that a need to perform the additional update arises due to depression of the ON key 421 on the additional update screen 420 of the operation unit 220 by the user (YES in step S101), the CPU 210 sets the additional update flag and stores the same in the SRAM 213 and obtains firmware for the additional update which is new software (step S102).

The CPU 210 then determines whether or not the regular update is set (step S103). Here, as shown in FIG. 3, when firmware for the regular update was downloaded at the distribution time, and an application time for the firmware has not come yet, it is determined that the regular update is set. Namely, when the downloaded firmware for the regular update has not been applied to the image forming apparatus 100 and is stored in the flash ROM 219, the determination result in the step S103 is positive (YES).

As a result of the determination in the step S103, when the regular update is not set (NO in the step S103), the CPU 210 clears the additional update flag stored in the SRAM 213 (step S111). The CPU 210 then makes such a setting as to perform the additional update (step S112), and upon determining that the application time has come (YES in step S113), performs the additional update (step S114) and terminates the present process. Thus, when the regular update is not set, firmware for the additional update is immediately applied to the image forming apparatus 100.

Returning to the process in the step S103, when it is determined in the step S103 that the regular update is set (YES in the step S103), the CPU 210 cancels the regular update (step S104) and combines the firmware for the regular update and the firmware for the additional update with each other to reconfigure new firmware to be updated (step S105).

The CPU 210 then clears the additional update flag stored in the SRAM 213 (step S106) and displays the additional update setting screen 420 (see FIG. 2) on the operation unit 220 (step S107).

The CPU 210 determines whether or not the immediate key 422 has been depressed on the additional update setting screen 420 (step S108). As a result of the determination in the step S108, when the immediate key 422 has been depressed (YES in the step S108), and it is determined that the application time has come (YES in the step S113), the CPU 210 performs the additional update (step S114) and terminates the present process. In this case, because the immediate key 422 was depressed in the step S108, the current time is set as the application time. Thus, the additional update is immediately performed.

On the other hand, as a result of the determination in the step S108, when the immediate key 422 has not been depressed (NO in the step S108), the CPU 210 determines whether or not a date and time has been set in the additional application time setting field 423 (step S109).

As a result of the determination in the step S109, when a date and time has been set in the additional application time setting field 423 (YES in the step S109), the CPU 210 performs the additional update (step S114) upon determining that the set application time has come (YES in the step S113), and terminates the present process.

On the other hand, as a result of the determination in the step S109, when a date and time has not been set in the additional application time setting field 423 (NO in the step S109), the CPU 210 performs the additional update (step S114) upon determining that the synchronized with regular updating key 424 has been depressed, and the set application time for the regular update has come (YES in the step S113), and terminates the present process.

The additional update process described above with reference to FIG. 6 is started in response to notification of the additional update received from the external server 250 as well as an instruction from the user, and this process may be started in response to the user inquiring of the external server 250, at short time intervals, about the presence or absence of a need to perform the additional update.

According to the present embodiment, the additional update can be coped with as appropriate while the regular update is performed as scheduled. Moreover, when a need to perform the additional update arises, an application time for firmware can be selected from immediate and specified time. As a result, firmware can be applied to the image processing apparatus 100 with desired timing, and therefore, convenience for the user can be enhanced.

Further, because an application time for the additional update is synchronized with timing of the regular update originally planned at the latest, the reliability of execution of the regular update and the additional update and the reliability of execution times of the regular update and the additional update can be ensured, so that updates of firmware can be reliably performed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-126607 filed Jun. 17, 2013, which is hereby incorporated by reference herein in its entirety.

What is claimed is:

1. An image forming apparatus that performs printing, comprising:
a memory connected to a processor;
a setting unit configured to set an update schedule for regularly updating firmware for the image forming apparatus using update firmware based on a user instruction;
an updating unit configured to update the firmware for the image forming apparatus according to the update schedule set by the setting unit;
an accepting unit configured to accept an instruction to perform an additional update using additional firmware;
a firmware preparation unit configured to prepare firmware to be used for an update in accordance with the additional firmware and the update firmware which was scheduled to be used in the update schedule set by the setting unit; and
a selecting unit configured to select a timing to perform the update using the firmware prepared by the firmware preparation unit from the update schedule set by the setting unit or a timing different from the update schedule set by the setting unit,
wherein the update unit is configured to perform the update using the firmware prepared by the firmware preparation unit, and
wherein the setting unit, the updating unit, the accepting unit, the firmware preparation unit and the selecting unit are implemented at least in part by the processor executing at least one program recorded on the memory.

2. A method of controlling an image forming apparatus that performs printing, the method comprising:
setting an update schedule for regularly updating firmware for the image forming apparatus using update firmware based on a user instruction;
updating the firmware for the image forming apparatus according to the set update schedule;
accepting an instruction to perform an additional update using additional firmware;
preparing firmware to be used for an update in accordance with the additional firmware and the update firmware which was scheduled to be used in the update schedule; and
selecting a timing to perform the update using the prepared firmware from the set update schedule or a timing different from the set update schedule,
wherein the update is performed using the prepared firmware.

3. A non-transitory computer-readable storage medium storing a program that, when executed by a computer, causes the computer to perform a method of controlling an image forming apparatus that performs printing, the method comprising:

setting an update schedule for regularly updating firmware for the image forming apparatus using update firmware based on a user instruction;

updating the firmware for the image forming apparatus according to the set update schedule;

accepting an instruction to perform an additional update using additional firmware;

preparing firmware to be used for an update in accordance with the additional firmware and the update firmware which was scheduled to be used in the update schedule; and selecting a timing to perform the update using the prepared firmware from the set update schedule or a timing different from the set update schedule, wherein the update is performed using the prepared firmware.

4. The image forming apparatus according to claim 1, further comprising a display configured to display a first setting screen for a user to set the update schedule and a second setting screen for a user to select the timing to perform an update using the firmware prepared by the firmware preparation unit from the update schedule set by the setting unit or the timing different from the update schedule set by the setting unit.

5. The image forming apparatus according to claim 1, wherein after the accepting unit accepts the instruction, the update schedule set by the setting unit is canceled.

6. The image forming apparatus according to claim 1, wherein after the accepting unit accepts the instruction, the firmware preparation unit combines the update firmware for regular update and the additional firmware for the additional update with each other to reconfigure new firmware to be updated.

7. The image forming apparatus according to claim 1, wherein in accordance with a selection by the selecting unit, a current time which is the timing different from the update schedule set by the setting unit is set as an update time for the firmware.

8. The method of claim 2, further comprising displaying a first setting screen for a user to set the update schedule and a second setting screen for a user to select the timing to perform an update, using the prepared firmware, from the set update schedule or the timing different from the set update schedule.

9. The method of claim 2, wherein after the instruction is accepted, the set update schedule is canceled.

10. The method of claim 2, wherein after the instruction is accepted, the update firmware for regular update and the additional firmware for the additional update are combined with each other to reconfigure new firmware to be updated.

11. The method of claim 2, wherein in accordance with the selection of a timing, a current time which is the timing different from the set update schedule is set as an update time for the firmware.

* * * * *